(12) United States Patent
Pena Pena et al.

(10) Patent No.: US 11,861,884 B1
(45) Date of Patent: Jan. 2, 2024

(54) SYSTEMS AND METHODS FOR TRAINING AN INFORMATION EXTRACTION TRANSFORMER MODEL ARCHITECTURE

(71) Applicant: Intuit, Inc., Mountain View, CA (US)

(72) Inventors: Karelia Del Carmen Pena Pena, Boothwyn, PA (US); Tharathorn Rimchala, San Francisco, CA (US); Peter Lee Frick, San Francisco, CA (US); Tak Yiu Daniel Li, Frisco, TX (US)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/297,708

(22) Filed: Apr. 10, 2023

(51) Int. Cl.
*G06V 10/80* (2022.01)
*G06V 30/413* (2022.01)
*G06V 30/19* (2022.01)

(52) U.S. Cl.
CPC ...... *G06V 10/811* (2022.01); *G06V 30/19147* (2022.01); *G06V 30/413* (2022.01)

(58) Field of Classification Search
None
See application file for complete search history.

(56) References Cited

U.S. PATENT DOCUMENTS

| | | | | |
|---|---|---|---|---|
| 10,713,794 | B1 * | 7/2020 | He | G06N 3/084 |
| 11,113,466 | B1 * | 9/2021 | Hira | G06F 40/216 |
| 11,216,660 | B2 * | 1/2022 | Rimchala | G06N 20/00 |
| 11,544,943 | B1 * | 1/2023 | Rimchala | G06V 10/82 |
| 11,593,555 | B1 * | 2/2023 | Anthony | G06F 18/214 |
| 2009/0208125 | A1 * | 8/2009 | Kajiwara | H04N 1/41 |
| | | | | 382/243 |
| 2020/0242774 | A1 * | 7/2020 | Park | G06N 3/045 |
| 2021/0012102 | A1 * | 1/2021 | Cristescu | G06F 40/284 |
| 2022/0092645 | A1 * | 3/2022 | Pan | G06N 20/00 |
| 2022/0319010 | A1 * | 10/2022 | Weese | G06T 7/174 |

OTHER PUBLICATIONS

Jiang, Haoming, et al. "Named Entity Recognition with Small Strongly Labeled and Large Weakly Labeled Data", https://arxiv.org/pdf/2106.08977.pdf, Aug. 1, 2021, 15 pages.

Huang, Yupan, et al. "LayoutLMv3: Pre-training for Document AI with Unified Text and Image Masking", https://arxiv.org/pdf/2204.08387.pdf, Jul. 19, 2022, 10 pages.

* cited by examiner

*Primary Examiner* — Tahmina N Ansari
(74) *Attorney, Agent, or Firm* — Dinsmore & Shohl LLP

(57) ABSTRACT

Certain aspects of the disclosure provide systems and methods for training an information extraction transformer model architecture directed to pre-training a first multimodal transformer model on an unlabeled dataset, training a second multimodal transformer model on a first labeled dataset to perform a key information extraction task processing the unlabeled dataset with the second multimodal transformer model to generate pseudo-labels for the unlabeled dataset, training the first multimodal transformer model based on a second labeled dataset comprising one or more labels, the pseudo-labels generated, or combinations thereof to generate a third multimodal transformer model, generating updated pseudo-labels based on label completion predictions from the third multimodal transformer model, and training the third multimodal transformer model using a noise-aware loss function and the updated pseudo-labels to generate an updated third multimodal transformer model.

20 Claims, 5 Drawing Sheets

SYSTEMS AND METHODS FOR TRAINING AN INFORMATION EXTRACTION TRANSFORMER MODEL ARCHITECTURE

BACKGROUND

Aspects of the present disclosure relate to training machine learning models, and more specifically, to training information extraction transformer models.

Extraction of information from documents is a classic task for machine learning models. A common challenge with the task is accurately extracting information from a wide range of different document types with multi-modal elements, such as layout, text, and imagery elements. Typically, model task performance is only improved by training models with a massive amount of consistently and accurately labeled training data. However, in real world applications, such data is almost never readily available, and obtaining it is time-consuming, costly, and generally impractical.

Accordingly, there is a need in the art for improved methods of training information extracting machine learning models with limited labeled data.

SUMMARY

Certain aspects provide a method for training an information extraction transformer model architecture. The method includes pre-training a first multimodal transformer model on an unlabeled dataset comprising documents including text features and layout features, training a second multimodal transformer model on a first labeled dataset comprising documents including text features and layout features to perform a key information extraction task, and processing the unlabeled dataset with the second multimodal transformer model to generate pseudo-labels for the unlabeled dataset. The method further comprises training the first multimodal transformer model to perform the key information extraction task based on a second labeled dataset comprising one or more labels, the pseudo-labels generated by the second multimodal transformer model, or combinations thereof, to generate a third multimodal transformer model, processing the unlabeled dataset with the third multimodal transformer model to update the pseudo-labels for the unlabeled dataset, and training the third multimodal transformer model using a noise-aware loss function and the updated pseudo-labels to generate an updated third multimodal transformer model.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
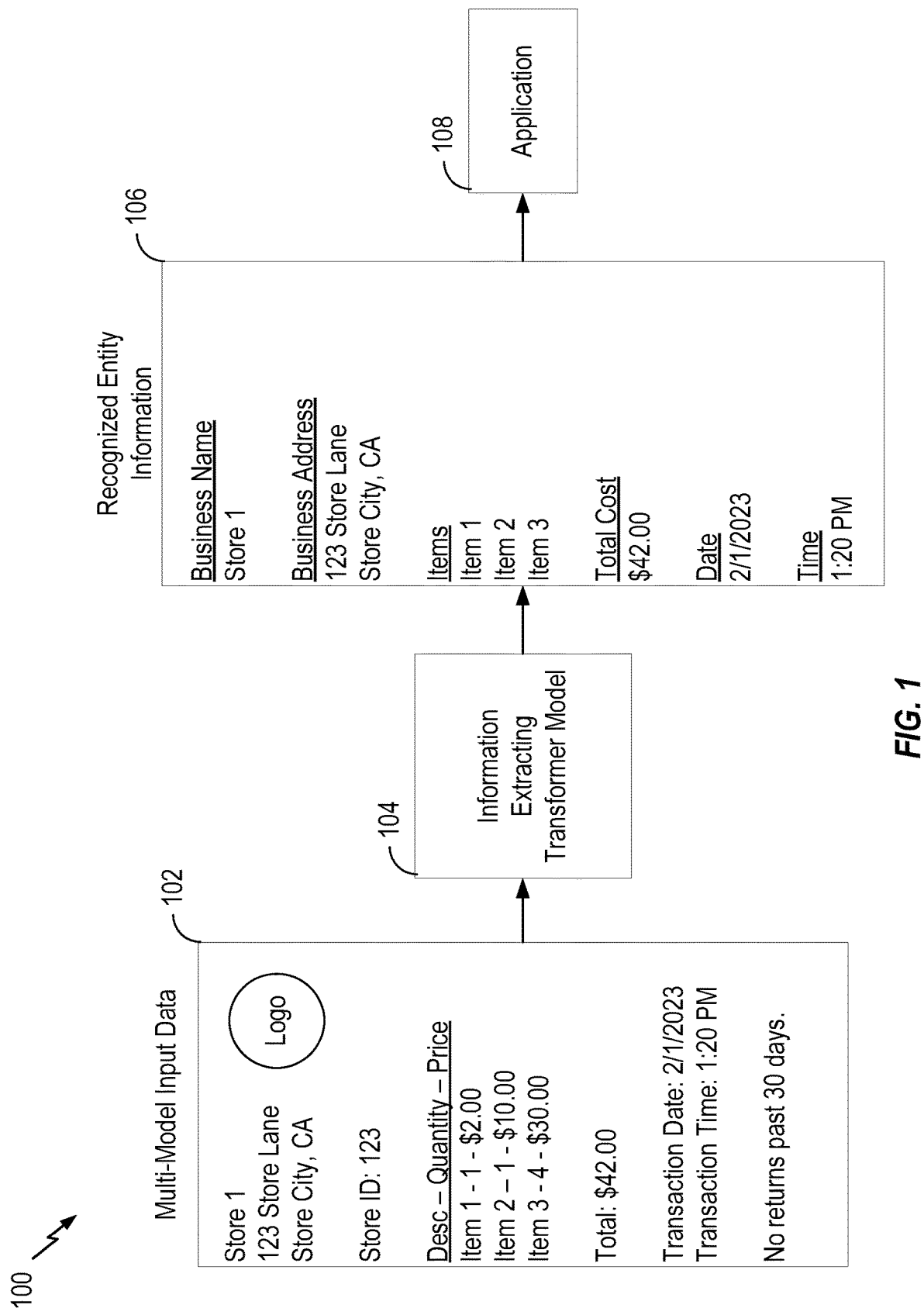
FIG. 1 depicts an example flow of input and output data and usage utilizing an information extraction transformer model architecture, according to one or more embodiments as described herein.

Aspects of the present disclosure provide apparatuses, methods, processing systems, and computer-readable mediums for training an information extraction transformer model architecture.

There are myriad tasks in which information from one domain (e.g., a physical document) needs to be extracted and used in another domain (e.g., in a software application). For example, a receipt may include information about a vendor (e.g., name), information about goods purchased (e.g., item names, quantities, amounts), information about the transaction (e.g., time and location), and others. All of these key information elements in the receipt may be necessary for an application that, for example, tracks expenditures for tax reasons. Unfortunately, manual (e.g., human) transcription of such data is often flawed, and, perhaps relatedly, tedious and time consuming. Mistranscription of such data may have serious consequences and thus is a technical problem needing solving.

Machine learning provides an effective technical solution for information extraction tasks. In particular, named entity recognition (NER) is a type of natural language processing (NLP) task performed by machine learning models that involves extracting and identifying key information from document text, such as in the text extracted from a receipt example above. An information element that is extracted and categorized, such as a transaction date in a receipt, is referred to as an "entity." Generally, an entity can be any word, series of words, arrangement of words, and/or image region that consistently refers to the same thing. For example, a name, trademark, and/or logo (image) may consistently refer to an organization.

Certain machine learning model architectures have proven particular adept at named entity recognition (NER) tasks, such as transformer-based models. Generally, transformer models may be implemented as neural networks with elements, such as various types of attention elements, that learn context and thus meaning by tracking relationships in sequential data. Further, multi-modal transformer models may perform NER tasks on data including text, layout, and image elements. Multi-modal transformer models represent the state-of-the-art for text- and image-centric key information extraction (KIE) tasks.

While machine learning model architectures, such as multi-modal transformers, provide a nominal solution to KIE tasks, they still generally rely on a large amount of manually and accurately labeled data for adequate training. Without a large amount of consistently and accurately labeled data, such models generally will not achieve acceptable levels of task performance. While the answer to this technical problem may seem straightforward—just obtain more labeled data—the vast amount of data types, contexts, and tasks to perform based on the data, make obtaining sufficient labeled data a technically difficult and prohibitively costly problem. This problem is only compounded by the desire to continually train and fine-tune models to incorporate new information from the relevant task domain.

Aspects described herein overcome this technical problem by providing an iterative training approach that applies supervised learning to a small, strongly labeled dataset in combination with weakly-supervised learning to a dataset having model generated pseudo-labels. Further, aspects described herein apply transfer learning and active learning to further improve the iterative training approach.

In particular, aspects described herein may start with a first, multi-modal transformer model pre-trained on a dataset that is out of domain for the target task. Out of domain in this context generally means that the data does not relate directly to the type or context of the actual task for which a model is being trained. For example, a transformer model may have been trained on generic natural language text containing documents, but not a set of documents specific to the target task. This first model may be "pre-trained" in an unsupervised fashion based on in-domain unlabeled data. For example, a generic multi-modal transformer model having never been trained on receipt images may be trained with a receipt image dataset where the domain of the target task is receipt entity recognition. The first model may be "pre-trained" in a continuous manner such that the first model may be initialized from a pre-trained state that may be publically available, then trained in an iterative fashion to continue to improve as an underlying base model used to train a third model, which third model may also be trained along with a second model, as described in greater detail below.

Next, a first labeled dataset, which may be an open-source dataset, may be used to train a second multi-modal transformer model, which, after being fully trained, can be used to create pseudo-labels for the in-domain unlabeled data.

Next, a third model is generated via training of the first model to perform key information extraction based on a second labeled dataset, which may be a closed-source labeled dataset, comprising one or more labels, the weakly-labeled dataset as pseudo-labels generated by the second model (e.g., as the generated pseudo-labels), or combinations thereof. In an embodiment, the third model may be trained on the closed-source labeled dataset as a small strongly labeled dataset (e.g., human annotated) when available in place of the pseudo-labels. Training of the first model to generate the third model based on the closed-source labeled dataset in place of the generated pseudo-labels of the second model allows for knowledge transfer from the first model to the third model and label enrichment. Training of the first model to generate the third model based on the generated pseudo-labels of the second model allows for knowledge transfer from the second model to the third model and iterative label enrichment. The unlabeled dataset may further be processed by the third multimodal transformer model to update the pseudo-labels for the unlabeled data. Owing to the nature of the partial weak-supervision for the third model (e.g., based on the pseudo-labels), this training may use an uncertainty-aware training objective such as through a noise-aware loss to allow the model to dynamically and differentially learn from different pseudo-labels based on the amount of label uncertainty.

Next the third model may be fine-tuned based on the strongly-labeled dataset.

In some cases, the third model may be further fine-tuned through a process of active learning. For example, to improve the model performance in high uncertainty/low confidence data points, uncertainty based active learning samples a subset of low uncertainty pseudo-labels for labeling by humans. The new inputs/labels pairs from this high uncertainty set is then added to the small set of strongly labeled data. This growing set of strongly-labeled data may be used for active and continual fine tuning. In some cases, the samples selected for strong labelling are selected based on a measure of uncertainty of the model's output, which is calibrated during training. This allows uncertainty-based sampling of samples for strong labelling.

The aforementioned training approach has many advantages over existing methods, and provides beneficial technical effects. For example, the training architecture allows for training a model with a small proportion of strongly-labeled data, while obtaining the technical effect of improved model performance, as if the model were trained with a large proportion of strongly-labeled data. Further, the training approach described herein enables improved identification and classification of extracted information from multimodal documents. Further, the uncertainty-aware loss ensures the updated model is not overfit to the high uncertainty/low confidence data points. Further yet, the confidence calibration that is used as part of the combination of weakly-labeled and strongly-labeled data allows for uncertainty-based sampling during active learning, thereby having the technical effect of improving pseudo-labels quality via the active learning process and rapidly incorporating new information into the model's training.

Example Methodologies for Use and Training of an Information Extraction Transformer Model Architecture FIG. 1 depicts an example flow 100 for processing multimodal input data 102 with an information extraction transformer model 104 (also referenced herein as model architecture 104).

In particular, a multimodal data input 102 is received by the model architecture 104. The multimodal data input 102 may include text features, layout features, image features, or combinations thereof. In example embodiments, text features may include textual characters embedded in a document, layout features may include a style of a layout of the document (such as a table of purchases alongside amounts in a receipt), and image features may include one or more images in the document (e.g., logos, photographs, QR codes, and/or other ornamental representations). In some cases, multimodal data input 102 may be a document, an image, an image of a document, and or another electronic form of data that may include or not include metadata. In some cases, multimodal data input 102 may be captured by a sensor of a device, such as a scanner, camera, or the like.

The information extracting transformer model 104 is configured to process the multimodal data input 102 to generate extracted data 106 as recognized entity information (e.g., key entity information) that is classified into one or more classification types (i.e., whether an extracted item is a description, quantity, or price in a receipt that is associated with a product sold by an identified vendor at an identified time). The identification of various entities and their corresponding values may be used as inputs (e.g., to corresponding fields) to application 108 without manual intervention thus providing a faster and more accurate method for data capture, transcription, and entry. For example, application 108 may be a financial software program that processes the recognized entity information 106.

Beneficially, the methods for training information extracting transformer model 104 described herein improve task performance compared to conventional methods because they are able to leverage larger training datasets, including self-generated pseudo-labels, without human intervention.

In embodiments, the multimodal data input 102 may include financial documents such as bills, receipts, tax documents, statements, or similar documents including text, layout, and image data. For example, an amount of $10 associated with a second item purchased at a store as reflected on a receipt as shown in FIG. 1 may be extracted, labeled, and classified accordingly by the information extracting transformer model 104. The extracted and identified data may then be entered into the application 108.

Example Training Flow for an Information Extracting Transformer Model

Figure 2:
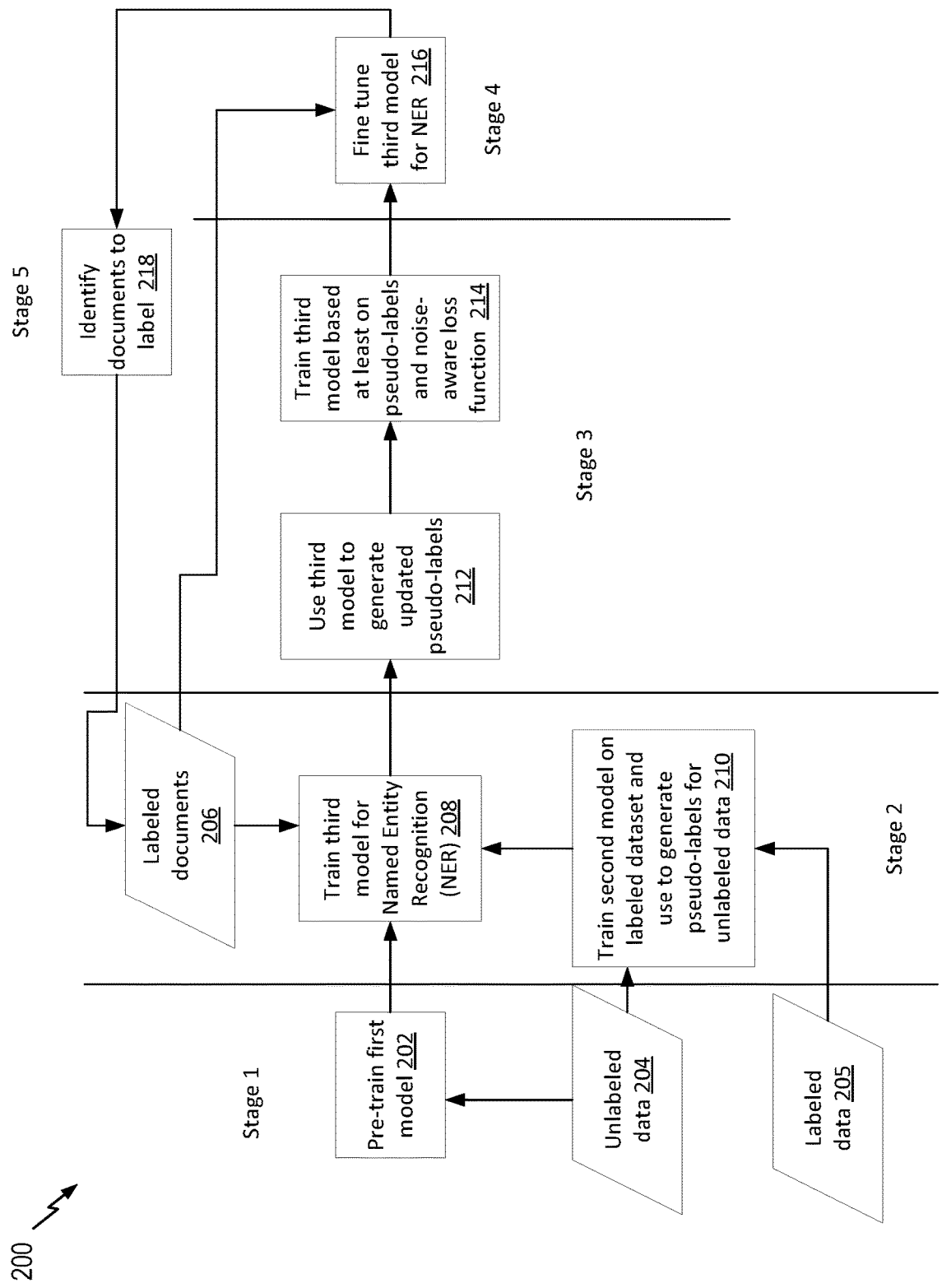
FIG. 2 depicts an embodiment of a training flow of the information extraction transformer model architecture of FIG. 1.

FIG. 2 depicts an embodiment of a training flow 200 of the information extracting transformer model, such as model 104 of FIG. 1.

As will be described in greater detail further below, process block 202 is part of a first training stage (e.g., Stage 1 of FIG. 2) in which a first model is pre-trained on a dataset, which may include a large amount of unlabeled data.

Process blocks 208 and 210 are part of a second training stage (e.g., Stage 2 of FIG. 2) associated with pseudo-label generation, process blocks 212 and 214 are part of a third training stage (e.g., Stage 3 of FIG. 2) associated with pseudo-label completion and uncertainty-aware training, process block 216 is part of a fourth training stage (e.g., Stage 4 of FIG. 2) associated with fine-tuning, and process block 218 is part of a fifth training stage (e.g., Stage 5 of FIG. 2) associated with active learning. Each stage will be described in greater detail further below in association with description of the corresponding process blocks.

In process block 202, the first multimodal transformer model (e.g., 302 in FIG. 3) is pre-trained on unlabeled data of input block 204. Pre-training at process block 202 is useful to build a general model of contextual multi-modal document representations before being trained in a task oriented manner for specific KIE tasks, such as multi-modal named entity recognition for documents. Pre-training a model generally involves an initial training of a model on the sequential occurrence of elements in an unlabeled dataset and then using parts or all of the parameters from the pre-trained model as an initialization for another model on another task or dataset. As described below, pre-training schemes may be used at process block 202, such as masked language modeling (MLM) for text modality, masked image modeling (MIM) for image modality, and word-path alignment (WPA) for cross-modal alignment to predict whether a corresponding image patch of a text word is masked.

In embodiments, the first multimodal transformer model may be referred to as a "base" multimodal transformer model and in some cases may be a state-of-the-art multimodal transformer model configured to perform a variety of document AI tasks, such as document classification and key information extraction. The first (base) multimodal transformer model may be pre-trained on a dataset that is out of domain or otherwise not relevant to the task for which the updated model is being ultimately trained by training flow 200. In some cases the out of domain dataset may be a private domain dataset (e.g., one that is not available to the public). The multimodal transformer model may be configured to be trained for document AI-type tasks using unified text and image masking objectives and pre-training schemes such as MLM, MIM, and WPA, as described above. Further, the model may be pre-trained at process block 202 utilizing unsupervised training to allow the pre-trained model to capture contextual representations that occur in the multimodal document datasets.

In process block 210, the second multimodal transformer model (e.g., 304 of FIG. 3) is trained on a labeled dataset for KIE task 205. In some cases, this training data set may be an open source data set that is available in the public domain. Thus, the second multimodal transformer model may be trained utilizing existing and available open source data sets, beneficially reducing the resource requirements for building, maintaining, and/or using internal closed-source datasets. In embodiments, the second multimodal transformer model may be a multimodal transformer model trained on the open source labeled dataset for a KIE task. The trained second multimodal transformer model is used to generate pseudo-labels for the unlabeled data 204 (that may be retrieved from a private domain). Thus, the second multimodal transformer model is trained with a small proportion of strongly-labeled data along with a larger proportion of unlabeled data to generate pseudo-labels for the unlabeled data to obtain the technical effect of improved model performance via use of the generated pseudo-labels.

Figure 3:
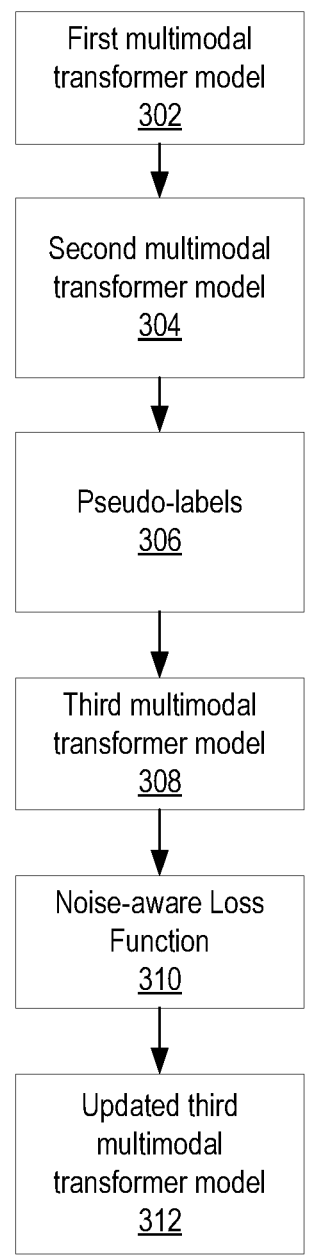
FIG. 3 depicts a flow of aspects associated with the training flow of FIG. 2.

In process block 208, transfer learning occurs via transfer of knowledge from the first multimodal transformer model to the third multimodal transformer model (e.g., 308 of FIG. 3). Transfer learning refers to an approach in which a machine learning model trained in one domain is used to learn and/or perform a task in a different but maybe related domain. The third multimodal transformer model is thus initialized based on a state (set of model parameters) of the first multimodal transformer model that should capture the contextual representation learned from the unlabeled data in block 204.

In process block 212 of FIG. 2, the third multimodal transformer model is configured to generate updated pseudo-labels (e.g., 306 of FIG. 3). In embodiments, given the pseudo-labels from the second multimodal transformer and the third multimodal transformer model together with respective uncertainty scores, the processor may perform an uncertainty-aware label completion on the pseudo-labels to generate the updated correct pseudo-labels reducing the incompleteness of the pseudo-labels that are generated.

In process block 214, the third multimodal transformer model is trained in an uncertainty-aware manner based on at least (i) the pseudo-labels as updated in process block 212 and (i) the noise-aware loss function (e.g., 310 of FIG. 3) to generate the updated multimodal transformer model (e.g., 312 of FIG. 3). In some embodiments, a calibrated confidence score of each of the pseudo-labels based on the second multimodal transformer model. Then during the training of the third multimodal transformer model the noise-aware loss function, which takes account of the calibrated scores as weight coefficient for each pseudo label, is used to compute the iterative updates of the parameters. In embodiments, the calibrated confidence score may be determined utilizing a Dirichlet calibration, which is a model agnostic multiclass calibration method applicable to classifiers from any model class and derived from Dirichlet distributions. Dirichlet distributions are a family of continuous multivariate probability distributions parameterized by a vector of positive real numbers and are a multivariate generalization of the beta distribution. The beta distribution is a family of continuous probability distributions defined in terms of two positive parameters on the interval between zero and one, which parameters appear as exponents that control the distribution shape. The noise-aware loss function may be based on an estimated confidence of the updated pseudo-labels, such as by using the Dirichlet calibration, to adjust the confidence score of updated pseudo-labels to reflect the estimated accuracy of pseudo-labels. A sample equation for the noise-aware loss function is set forth below.

$$L_{NA}(\tilde{Y}^c, f(\tilde{X};\theta)) = \hat{P}(\tilde{Y}^c = \tilde{Y}|\tilde{X}) L(\tilde{Y}^c, f(\tilde{X};\theta)) + \hat{P}(\tilde{Y}^c \neq \tilde{Y}|\tilde{X}) L^{-1}(\tilde{Y}^c, f(\tilde{X};\theta))$$ (EQUATION 1)

In Equation 1, $\hat{P}(\tilde{Y}^c=\tilde{Y}|\tilde{X})$ is the estimated confidence of the updated corrected pseudo-labels. The loss functions L and $L^{-1}$ represent the negative log-likelihood and the negative log-unlikelihood, respectively. Further, $\tilde{X}$ represent the input unlabeled data, $\tilde{Y}$ represents the true labels, $\tilde{Y}^c$ represent the corrected pseudo-labels, and $f(\tilde{X};\theta)$ represents the model prediction.

Figure 5:
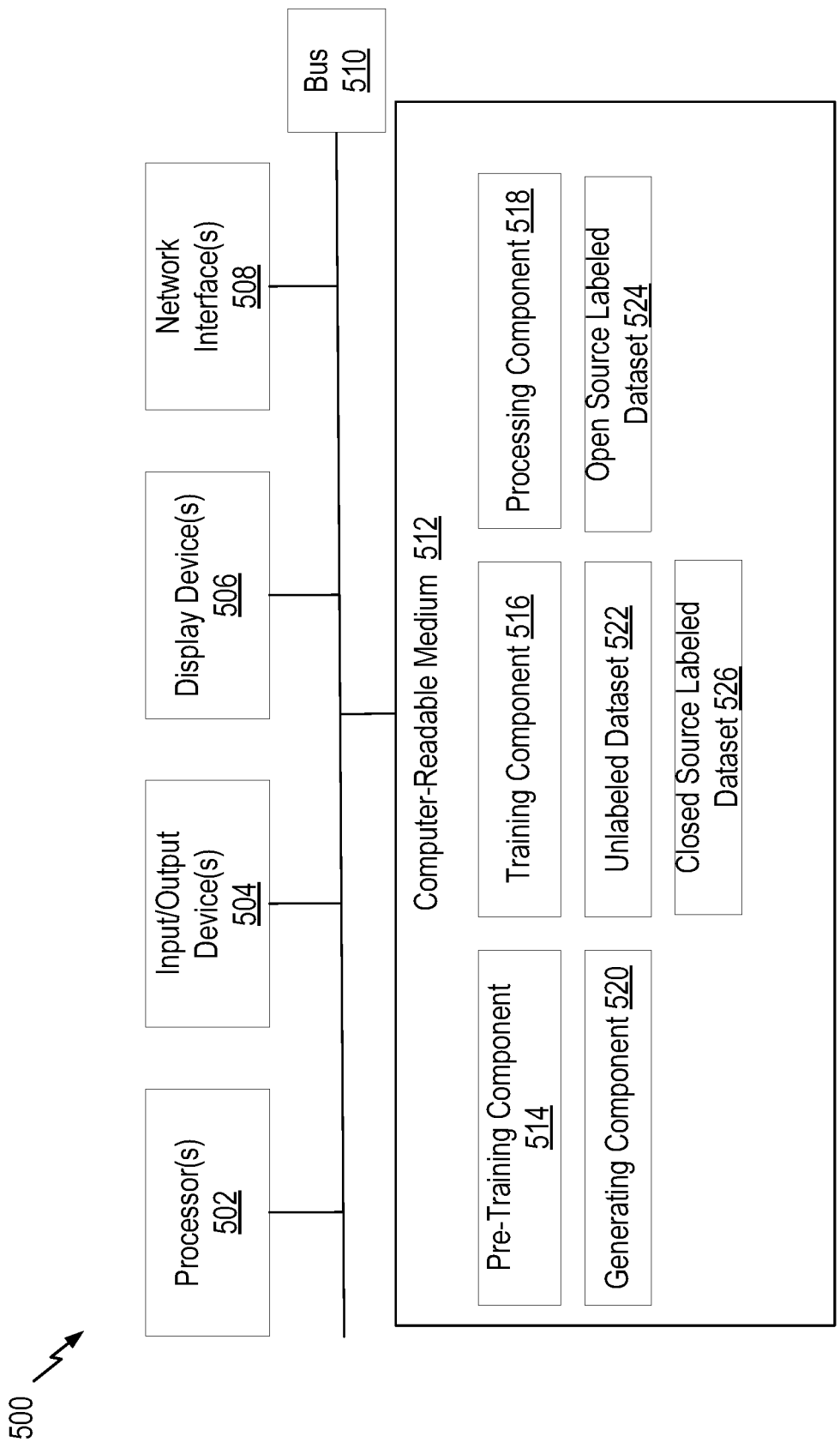
FIG. 5 depicts an example processioning system with which aspects of the present disclosure can be performed.

In the third training stage, pseudo-label completion and uncertainty-aware training is performed on the third multimodal transformer model based on one or more labels from a closed-source labeled dataset (e.g., 526 of FIG. 5). In some cases, the closed-source labeled dataset may be retrieved from a private domain and for which the one or more labels are manually annotated. A private domain is generally a domain that is not externally accessible without, for example, access rights, and is private to an internal domain, whereas a public domain is generally a domain that is externally accessible and is available across domains without requiring access rights. A public domain may be used, for example, as for retrieval of open-source datasets.

As set forth above, a calibrated confidence score of each pseudo-labels predicted by the second multimodal transformer model and the third multimodal transformer model may be input into the noise-aware loss function. The calibrated confidence score may be calculated, as described above, via a Dirichlet calibration. The noise-aware loss function takes into account the confidence scores to weight the pseudo-labels. Thus, when used, the one or more labels from the closed-source labeled dataset may be weighted by the noise-aware loss function based on the calibrated confidence score of each of the pseudo labels generated by the second multimodal transformer model and the third multimodal transformer model.

In embodiments, the one or more labels from the closed-source labeled dataset may be used as label training samples in a few-shot learning approach. In a few-shot learning approach, a limited number of labeled examples are provided for each new class, while for a zero-shot learning approach, no labeled data is available for new classes. Thus, for a zero-shot learning approach embodiment, the one or more labels from the closed-source labeled dataset are not used.

In process block 216, the updated multimodal transformer model is optionally fine-tuned via an active learning loop. For example, the updated third multimodal transformer model may be fine-tuned based on the one or more labels of the closed-source labeled dataset.

In process block 218, one or more documents may be sampled for labeling and added to the set of labeled documents in process block 206 for continuous active learning (e.g., training the updated multimodal transformer model). The newly labeled documents 206 may then be utilized to continue to fine-tune the updated multimodal transformer model (e.g., for the KIE task. Thus, the updated multimodal transformer model may be continually improved by such active learning.

In embodiments in which the data is continually able to be labeled, an uncertainty based active learning loop may thus be employed that continuously selects such one or more documents for labeling that meet a threshold. For example, documents having a calibrated confidence score determined using the confidence values associated with the pseudo-labels may be selected when their calibrated confidence score is in a score range (e.g., higher or lower than a threshold value). In some cases, the selected documents in the score range may be ranked from a highest calibrated confidence score to a lowest calibrated confidence score, and a subset of the ranked documents may be selected for manual labeling.

FIG. 3 depicts a flow of aspects 300 associated with the training flow 200 of FIG. 2. The flow of aspects 300 include a first multimodal transformer model 302, a second multimodal transformer model 304, pseudo-labels 306, a third multimodal transformer model 308, a noise-aware loss function 310, and an updated third multimodal transformer model 312 in an order of creation and processing in accordance with the training flow 200 of FIG. 2. As described above with respect to FIG. 2, the first multimodal transfer model 302 is pre-trained on unlabeled data in Stage 1.

In Stage 2, the second multimodal transformer model 304 is trained on a labeled dataset (e.g., for a KIE task) and is used to generate pseudo-labels 306 for the unlabeled data. Further, transfer learning occurs by the subsequential warm initialization of the latter models from the prior models in the training flow. The third multimodal transfer model 308 is further trained based on the generated pseudo-labels 306.

In Stage 3, the third multimodal transformer model 308 may generate updated pseudo-labels 306 via an uncertainty-aware label completion (as described above with respect to process block 212 of FIG. 2). The third multimodal transformer model 308 may further be trained based on the updated pseudo-labels 306 and the noise-aware loss function 310 (as described above with respect to process block 214 of FIG. 2) to generate the updated multimodal transformer model 312.

Example Operations for Training an Information Extracting Transformer Model

Figure 4:
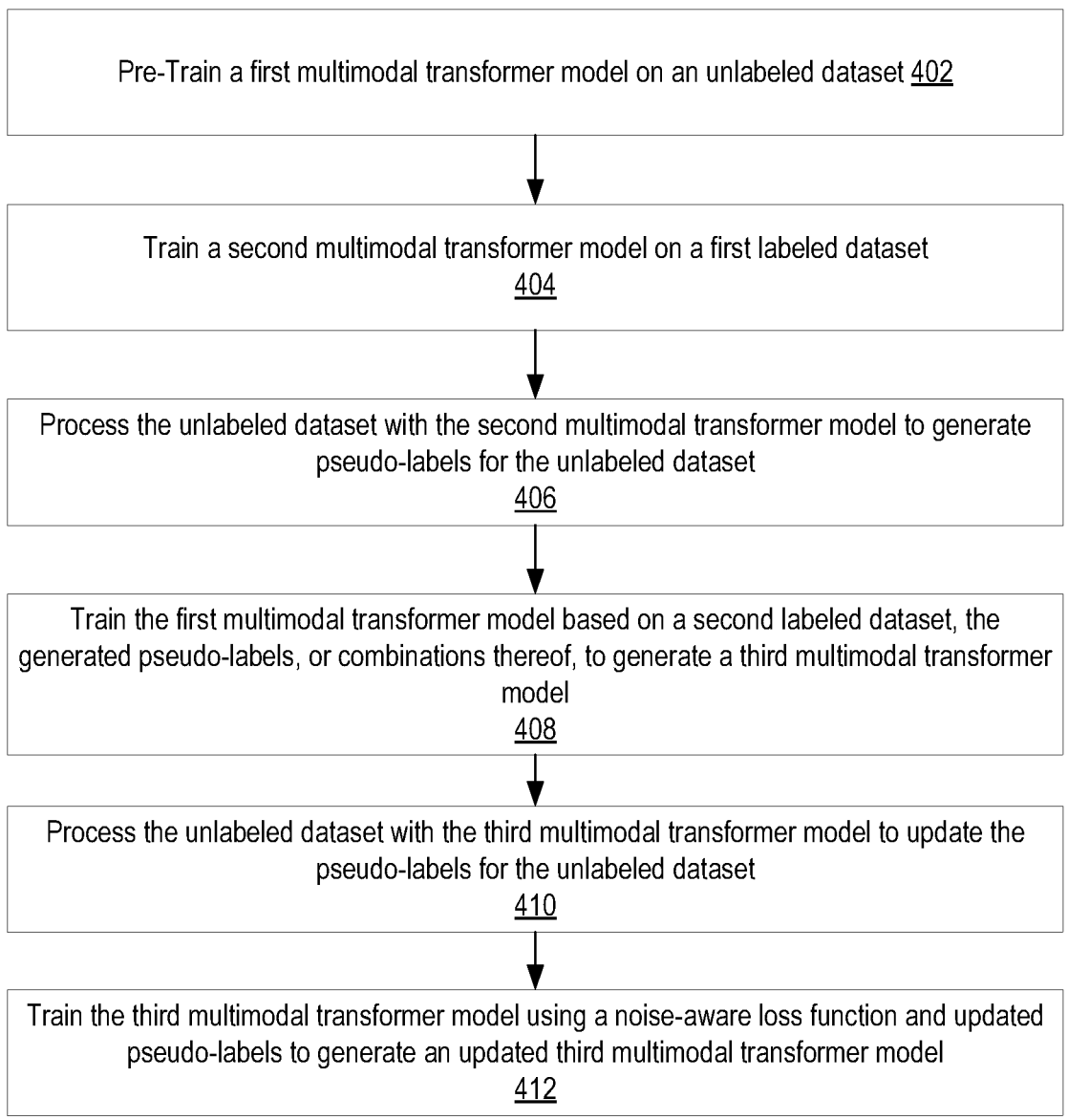
FIG. 4 depicts an example method for implementing the training flow of FIG. 2 utilizing the flow of aspects of FIG. 3.

FIG. 4 depicts an embodiment of a process 400 to implement the training flow 200 of FIG. 2 utilizing the flow of aspects 300 of FIG. 3.

In block 402, the first multimodal transformer model 302 (FIG. 3) is pre-trained on an unlabeled dataset (e.g., 522 of FIG. 5), as described in detail above (e.g., corresponding to the unlabeled data of input block 204 as input into process block 202 of FIG. 2). The unlabeled dataset may include documents including text, layout, and/or image features. In some embodiments, the unlabeled dataset may be retrieved from a private domain.

In block 404, corresponding to process block 210 of FIG. 2, the second multimodal transformer model 304 (FIG. 3) is trained, on an open source labeled dataset (e.g., 524 of FIG. 5) comprising documents including text features and layout features to perform a named entity recognition task. The open source labeled dataset may include documents including text features and layout features. In embodiments, the documents of the open source labeled dataset may additionally or alternatively include image features and other multimodal features. The open source labeled dataset may be retrieved from a public domain.

In block 406, corresponding to process block 210 of FIG. 2, the unlabeled dataset is processed with the second multimodal transformer model 304 to generate pseudo-labels 306 for the unlabeled dataset.

In block 408, corresponding to process block 208 of FIG. 2, the third multimodal transformer model 306 is trained based on at least the pseudo-labels 308 generated by the second multimodal transformer model 304 in block 406 and to perform the named entity recognition task. In embodiments, the third multimodal transformer model 306 is an updated version of the first multimodal transformer model 302 corresponding to process block 202 of FIG. 2.

In block 410, updated pseudo-labels 306 are generated by the second and the third multimodal transformer model 304 and 308 (corresponding to process block 212 of FIG. 2) based on label completion process.

In block 412, corresponding to process block 214 of FIG. 2, the third multimodal transformer model 308 is further trained using the noise-aware loss function 310 and the updated pseudo-labels 308 to generate the updated third multimodal transformer model 312. In embodiments, the third multimodal transformer model 306 may be trained further using a closed-source labeled dataset (e.g., 526 of FIG. 5) comprising one or more labels. The one or more labels of the closed-source labeled dataset may be human annotated labels. Further, the noise-aware loss function 310 may include a calibrated confidence score of each of the pseudo-labels generated by the second multimodal transformer model 304 and the third multimodal transformer model 306 as an input used to weight the pseudo-labels 308 and the one or more labels from the closed-source labeled dataset.

The updated third multimodal transformer model 312 may be fine-tuned based on the closed-source labeled dataset.

Further, one or more new documents to be labeled for further training of the updated third multimodal transformer model 312 may be identified (corresponding to process block 218 of FIG. 2). In some embodiments, the one or more new documents may be identified based on a set of calibrated confidence scores indicative of model uncertainty for the one or more unlabeled documents. When the calibrated confidence score is above a predetermined threshold, a corresponding document may be identified to be labeled and/or as a labeled document (corresponding to input block 206 of FIG. 2) for further training of the updated third multimodal transformer model 312. The updated third multimodal transformer model 312 may be utilized to classify and label key information elements in one or more multimodal documents, such as the documents input as multimodal data input 102 as described above in FIG. 1.

Note that FIG. 4 is just one example of a method, and other methods including fewer, additional, or alternative steps are possible consistent with this disclosure.

Example Processing System for Training an Information Extraction Transformer Model FIG. 5 depicts an example processing system 500 configured to perform various aspects described herein, including, for example, the methods of flow 100, training flow 200, flow of aspects 300, and process 400 as described above with respect to FIGS. 1-4.

Processing system 500 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 400 includes one or more processors 502, one or more input/output devices 504, one or more display devices 506, and one or more network interfaces 508 through which processing system 500 is connected to one or more networks (e.g., a local network, an intranet, the Internet, or any other group of processing systems communicatively connected to each other), and computer-readable medium 512.

In the depicted example, the aforementioned components are coupled by a bus 510, which may generally be configured for data and/or power exchange amongst the components. Bus 510 may be representative of multiple buses, while only one is depicted for simplicity.

Processor(s) 502 are generally configured to retrieve and execute instructions stored in one or more memories, including local memories like the computer-readable medium 512, as well as remote memories and data stores. Similarly, processor(s) 502 are configured to retrieve and store application data residing in local memories like the computer-readable medium 512, as well as remote memories and data stores. More generally, bus 510 is configured to transmit programming instructions and application data among the processor(s) 502, display device(s) 506, network interface(s) 508, and computer-readable medium 512. In certain embodiments, processor(s) 502 are included to be representative of a one or more central processing units (CPUs), graphics processing unit (GPUs), tensor processing unit (TPUs), accelerators, and other processing devices.

Input/output device(s) 504 may include any device, mechanism, system, interactive display, and/or various other hardware components for communicating information between processing system 500 and a user of processing system 500. For example, input/output device(s) 504 may include input hardware, such as a keyboard, touch screen, button, microphone, and/or other devices for receiving inputs from the user. Input/output device(s) 504 may further include display hardware, such as, for example, a monitor, a video card, and/or other another device for sending and/or presenting visual data to the user. In certain embodiments, input/output device(s) 504 is or includes a graphical user interface.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices.

Network interface(s) 508 provides processing system 500 with access to external networks and thereby to external processing systems. Network interface(s) 508 can generally be any device capable of transmitting and/or receiving data via a wired or wireless network connection. Accordingly, network interface(s) 508 can include a communication transceiver for sending and/or receiving any wired and/or wireless communication. For example, Network interface(s) 508 may include an antenna, a modem, a LAN port, a Wi-Fi card, a WiMAX card, cellular communications hardware, near-field communication (NFC) hardware, satellite communication hardware, and/or any wired or wireless hardware for communicating with other networks and/or devices/systems. In certain embodiments, network interface(s) 508 includes hardware configured to operate in accordance with the Bluetooth® wireless communication protocol.

Computer-readable medium 512 may be a volatile memory, such as a random access memory (RAM), or a nonvolatile memory, such as nonvolatile random access memory, phase change random access memory, or the like. In this example, computer-readable medium 512 includes a pre-training component 514, a training component 516, a processing component 518, a generating component 520, an unlabeled dataset 522, an open source labeled dataset 524, and a closed-source labeled dataset 526.

In certain embodiments, the pre-training component 514 is configured to pre-train the first multimodal transformer model (e.g., 302 of FIG. 3) on the unlabeled dataset 522 comprising multimodal documents including at least text features and layout features as set forth above in block 402 of FIG. 4. The training component 516 is configured to train one or more models as described herein. As a non-limiting example, the training component 516 is configured to train the second multimodal transformer model (e.g., 304 of FIG. 3) on the open source labeled dataset 524 comprising multimodal documents including at least text features and layout features to perform the named entity recognition task as set forth in block 404 of FIG. 4.

The processing component 518 is configured to process the unlabeled dataset 522 with the second multimodal transformer model (e.g., 304 of FIG. 3) to generate pseudo-labels 306 for the unlabeled dataset 522 as set forth in block 406 of FIG. 4. The training component 516 may further be configured to train the first multimodal transformer model to perform the named entity recognition task as set forth in block 408 of FIG. 4 based on at least the pseudo-labels 306 generated by the second multimodal transformer model 304 to generate the third multimodal transformer model (e.g., 308 of FIG. 3).

The generating component 520 is configured to generate updated pseudo-labels (e.g., 308 of FIG. 3) based on label completion predictions from the third multimodal transformer model 308 as also set forth in block 408 of FIG. 4. The training component 516 may further be configured to train the third multimodal transformer model 308 using a noise-aware loss function 310 and the updated pseudo-labels 306 to generate the updated third multimodal transformer model 312 as set forth in block 412 of FIG. 4.

Note that FIG. 5 is just one example of a processing system consistent with aspects described herein, and other processing systems having additional, alternative, or fewer components are possible consistent with this disclosure.

Example Clauses

Implementation examples are described in the following numbered clauses:

Clause 1: A method for training an information extraction transformer model architecture, comprising pre-training a first multimodal transformer model on an unlabeled dataset comprising documents including text features and layout features; training a second multimodal transformer model on source first labeled dataset comprising documents including text features and layout features to perform a key information extraction task; processing the unlabeled dataset with the second multimodal transformer model to generate pseudo-labels for the unlabeled dataset; training the first multimodal transformer model to perform the key information extraction task based on a second labeled dataset comprising one or more labels, the pseudo-labels generated by the second multimodal transformer model, or combinations thereof, to generate a third multimodal transformer model; generating updated pseudo-labels based on label completion predictions from the third multimodal transformer model; and training the third multimodal transformer model using a noise-aware loss function and the updated pseudo-labels to generate an updated third multimodal transformer model.

Clause 2: The method in accordance with Clause 1, wherein the unlabeled dataset is retrieved from a private domain, the first labeled dataset comprises an open source labeled dataset retrieved from a public domain, and the second labeled dataset comprises a closed-source labeled dataset.

Clause 3: The method in accordance with any of one of Clauses 1-2, wherein the unlabeled dataset and the first labeled dataset each further comprise documents including image features.

Clause 4: The method in accordance with any one of Clauses 1-3, further comprising training the third multimodal transformer model based on the second labeled dataset comprising the one or more labels when available in place of the pseudo-labels generated by the second multimodal transformer model.

Clause 5: The method in accordance Clause 4, wherein the noise-aware loss function comprises a calibrated confidence score of each of the second multimodal transformer model and the third multimodal transformer model as an input used to weight the pseudo-labels and the one or more labels from the second labeled dataset.

Clause 6: The method in accordance with any one of Clauses 4-5, further comprising fine-tuning the updated third multimodal transformer model based on the second labeled dataset.

Clause 7: The method in accordance with any one of Clauses 1-6, further comprising identifying one or more new documents to be labeled for further training of the updated third multimodal transformer model based on calibrated confidence scores indicative of an uncertainty of the pseudo-labels for the one or more new documents, wherein the confidence scores are within a predetermined threshold.

Clause 8: The method in accordance with any one of Clauses 1-7, further comprising utilizing the updated third multimodal transformer model to classify and label key information elements in one or more multimodal documents.

Clause 9: A processing system, comprising: a memory comprising computer-executable instructions; and a processor configured to execute the computer-executable instructions and cause the processing system to perform operations comprising a method in accordance with any one of Clauses 1-8.

Clause 10: A processing system, comprising means for performing operations comprising a method in accordance with any one of Clauses 1-8.

Clause 11: A non-transitory computer-readable medium comprising computer-executable instructions that, when executed by a processor of a processing system, cause the processing system to perform operations comprising a method in accordance with any one of Clauses 1-8.

Clause 12: A computer program product embodied on a computer-readable storage medium comprising code for performing operations comprising a method in accordance with any one of Clauses 1-8.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training an information extraction transformer model architecture, comprising:
    pre-training a first multimodal transformer model on an unlabeled dataset comprising documents including first text features and first layout features;
    training a second multimodal transformer model on a first labeled dataset comprising documents including second text features and second layout features to perform a key information extraction task;
    processing the unlabeled dataset with the second multimodal transformer model to generate pseudo-labels for the unlabeled dataset;
    training the first multimodal transformer model to perform the key information extraction task based on (i) a second labeled dataset comprising one or more labels, (ii) the pseudo-labels generated by the second multimodal transformer model, or (iii) combinations thereof, in order to generate a third multimodal transformer model;
    processing the unlabeled dataset with the third multimodal transformer model to generate updated pseudo-labels for the unlabeled dataset; and
    training the third multimodal transformer model using a noise-aware loss function and the updated pseudo-labels to generate an updated third multimodal transformer model.

2. The method of claim 1, wherein the unlabeled dataset is retrieved from a private domain, the first labeled dataset comprises an open source labeled dataset retrieved from a public domain, and the second labeled dataset comprises a closed-source labeled dataset.

3. The method of claim 1, wherein the unlabeled dataset and the first labeled dataset each further comprise documents including image features.

4. The method of claim 1, further comprising training the third multimodal transformer model based on the second labeled dataset comprising the one or more labels when available in place of the pseudo-labels generated by the second multimodal transformer model.

5. The method of claim 4, wherein the noise-aware loss function comprises a calibrated confidence score of each of the second multimodal transformer model and the third multimodal transformer model as an input used to weight the pseudo-labels and the one or more labels from the second labeled dataset.

6. The method of claim 5, further comprising fine-tuning the updated third multimodal transformer model based on the second labeled dataset.

7. The method of claim 6, further comprising identifying one or more new documents to be labeled for further training of the updated third multimodal transformer model based on calibrated confidence scores indicative of an uncertainty of the pseudo-labels for the one or more new documents, wherein the calibrated confidence scores are within a predetermined threshold.

8. The method of claim 1, further comprising utilizing the updated third multimodal transformer model to classify and label key information elements in one or more multimodal documents.

9. A processing system, comprising: a memory comprising computer-executable instructions; and a processor configured to execute the computer-executable instructions and cause the processing system to:
- pre-train, via a pre-training component, a first multimodal transformer model on an unlabeled dataset comprising documents including first text features and first layout features;
- train, via a training component, a second multimodal transformer model on a first labeled dataset comprising documents including second text features and second layout features to perform a key information extraction task;
- process, via a processing component, the unlabeled dataset with the second multimodal transformer model to generate pseudo-labels for the unlabeled dataset;
- train, via the training component, the first multimodal transformer model to perform the key information extraction task based on (i) a second labeled dataset comprising one or more labels, (ii) the pseudo-labels generated by the second multimodal transformer model, or (iii) combinations thereof, in order to generate a third multimodal transformer model;
- process, via a generating component, the unlabeled dataset with the third multimodal transformer model to generate updated pseudo-labels for the unlabeled dataset; and
- train, via the training component, the third multimodal transformer model using a noise-aware loss function and the updated pseudo-labels to generate an updated third multimodal transformer model.

10. The processing system of claim 9, wherein the unlabeled dataset is retrieved from a private domain, and the first labeled dataset comprises an open source labeled dataset retrieved from a public domain.

11. The processing system of claim 9, wherein the unlabeled dataset and the first labeled dataset each further comprise documents including image features.

12. The processing system of claim 9, wherein the processor is further configured to cause the processing system to train the third multimodal transformer model based on the second labeled dataset comprising the one or more labels when available in place of the pseudo-labels generated by the second multimodal transformer model.

13. The processing system of claim 12, wherein the noise-aware loss function comprises a calibrated confidence score of each of the second multimodal transformer model and the third multimodal transformer model as an input used to weight the pseudo-labels and the one or more labels from the second labeled dataset.

14. The processing system of claim 13, wherein the processor is further configured to cause the processing system to fine-tune the updated third multimodal transformer model based on the second labeled dataset.

15. The processing system of claim 14, wherein the processor is further configured to cause the processing system to identify one or more new documents to be labeled for further training of the updated third multimodal transformer model based on calibrated confidence scores indicative of an uncertainty of the pseudo-labels for the one or more new documents, wherein the calibrated confidence scores are within a predetermined threshold.

16. A non-transitory computer-readable medium comprising computer-executable instructions that, when executed by a processor of a processing system, cause the processing system to perform operations, the operations comprising:
- pre-training a first multimodal transformer model on an unlabeled dataset comprising documents including first text features and first layout features;
- training a second multimodal transformer model on a first labeled dataset comprising documents including second text features and second layout features to perform a key information extraction task;
- processing the unlabeled dataset with the second multimodal transformer model to generate pseudo-labels for the unlabeled dataset;
- training the first multimodal transformer model to perform the key information extraction task based on (i) a second labeled dataset comprising one or more labels, (ii) the pseudo-labels generated by the second multimodal transformer model, or (iii) combinations thereof, in order to generate a third multimodal transformer model;
- processing the unlabeled dataset with the third multimodal transformer model to generate updated pseudo-labels for the unlabeled dataset; and
- training the third multimodal transformer model using a noise-aware loss function and the updated pseudo-labels to generate an updated third multimodal transformer model.

17. The non-transitory computer-readable medium of claim 16, wherein the unlabeled dataset and the first labeled dataset each further comprise documents including image features.

18. The non-transitory computer-readable medium of claim 16, wherein the operations further comprises train the third multimodal transformer model based on the second labeled dataset comprising the one or more labels when available in place of the pseudo-labels generated by the second multimodal transformer model, wherein the noise-aware loss function comprises a calibrated confidence score of each of the second multimodal transformer model and the third multimodal transformer model as an input used to weight the pseudo-labels and the one or more labels from the second labeled dataset.

19. The non-transitory computer-readable medium of claim 18, wherein the operations further comprises:
- fine-tuning the updated third multimodal transformer model based on the second labeled dataset; and
- identifying one or more new documents to be labeled for further training of the updated third multimodal transformer model based on calibrated confidence scores indicative of an uncertainty of the pseudo-labels for the one or more new documents, wherein the calibrated confidence scores are within a predetermined threshold.

20. The non-transitory computer-readable medium of claim 16, wherein the operations further comprise utilizing the updated third multimodal transformer model to classify and label key information elements in one or more multimodal documents.

* * * * *